United States Patent [19]

Aittama

[11] Patent Number: 5,092,725
[45] Date of Patent: Mar. 3, 1992

[54] LOCKING FASTENER

[75] Inventor: Robert W. Aittama, Livonia, Mich.

[73] Assignee: Ford Motor Company, Dearborn, Mich.

[21] Appl. No.: 419,401

[22] Filed: Oct. 10, 1989

[51] Int. Cl.$^5$ .............................................. F16B 39/00
[52] U.S. Cl. ..................................... 411/190; 411/326; 411/429; 411/978
[58] Field of Search ................ 411/190, 296, 299, 305, 411/324, 326, 327, 329, 332, 941, 940, 983, 978, 950, 951

[56] References Cited

U.S. PATENT DOCUMENTS

| 687,774 | 12/1901 | Oliver | 411/326 |
|---|---|---|---|
| 781,067 | 1/1905 | Hewitt | 411/326 |
| 1,163,810 | 12/1915 | Darby | 411/326 X |
| 1,253,149 | 1/1918 | Childers . | |
| 1,279,962 | 9/1918 | Anderson . | |
| 1,357,331 | 11/1920 | LeFauve . | |
| 1,397,808 | 11/1921 | Howarth . | |
| 1,609,563 | 12/1926 | Loy . | |
| 1,656,118 | 1/1928 | Joyal . | |
| 2,203,219 | 6/1940 | Jackman, Jr. . | |
| 2,318,590 | 5/1943 | Boynton . | |
| 4,617,118 | 10/1986 | Smart | 411/327 X |

FOREIGN PATENT DOCUMENTS

| 15374 | 1/1881 | Fed. Rep. of Germany . | |
|---|---|---|---|
| 818140 | 11/1951 | Fed. Rep. of Germany . | |
| 1209902 | 1/1966 | Fed. Rep. of Germany | 411/429 |
| 1575249 | 1/1970 | Fed. Rep. of Germany . | |
| 3309884 | 9/1974 | Fed. Rep. of Germany . | |
| 369672 | 7/1963 | Switzerland | 411/327 |

Primary Examiner—Rodney M. Lindsey
Attorney, Agent, or Firm—Roger May; Charles H. Ellerbrock

[57] ABSTRACT

A two member threaded fastener includes integral ribs and/or locking fingers formed concentrically around threaded portions of the two members which make up each fastener. The ribs and/or locking fingers interferingly interengage one another as the two members are threadedly intermated to either removably or permanently lock the members together as desired for a given application. Preferably, the locking fastener members are formed of a polymeric resin and include concentric annular rings which are spaced from the threaded portions of the fastener members by interconnecting webs and define axially extending ribs. The ribs are rounded and preferably sinusoidal for removably locking fastener members and are serrated for permanently locking fastener members.

2 Claims, 2 Drawing Sheets

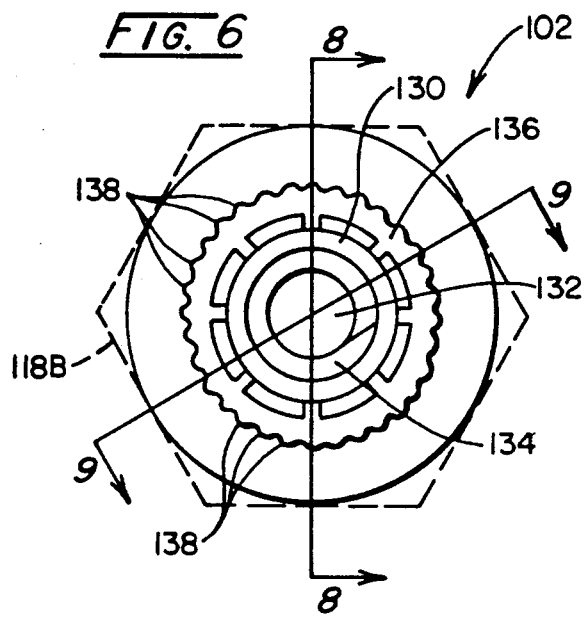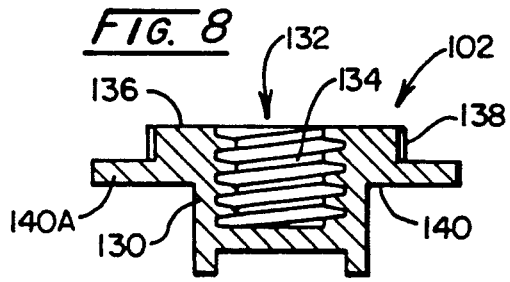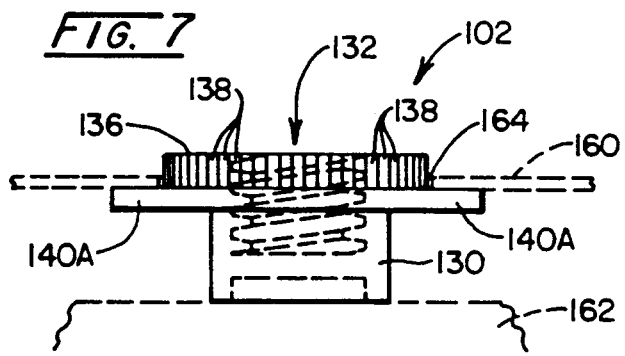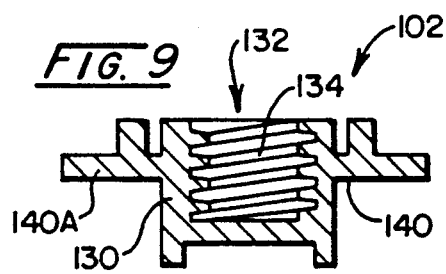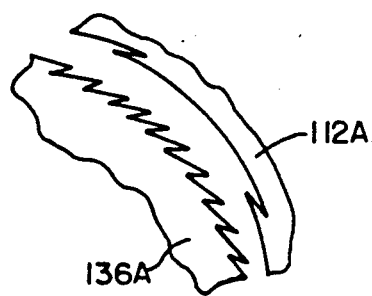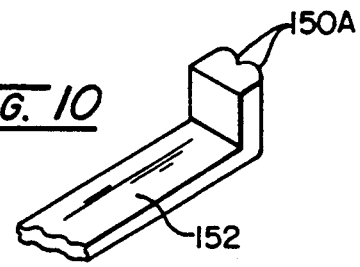

LOCKING FASTENER

BACKGROUND OF THE INVENTION

The present invention relates generally to threaded fasteners and, more particularly, to threaded fasteners which include integral locking means for preventing the unintended disengagement of the fasteners once they have been threadedly engaged.

There are many applications where fasteners must remain locked together after the fasteners have been installed. In these applications, the fasteners are typically subjected to vibration which tends to act against the forces holding the fasteners together, for example, threaded fasteners tend to "back-off" or separate when subjected to vibration. In the past, a variety of devices have been employed, for example, permanent fasteners such as rivets, spot welds or the like. However, oftentimes threaded fasteners are preferred due to ease of assembly and the potential for easy removal of the fasteners if the need arises in the future. For threaded fasteners, locking arrangements include among others a large variety of lock washers, coating the threads of one or both fastener parts with locking material and cotter pins. A variety of threaded fastener locking arrangements including drive pins, locking nuts and the like are disclosed in the following U.S. Pat. Nos. 1,279,962; 1,357,331; 1,397,808; 1,609,563; 1,656,118; and, 2,203,219. Unfortunately, these and other known threaded fastener locking arrangements require parts in addition to the fasteners themselves and oftentimes are complicated and difficult to assemble and/or install.

Accordingly, there is a need for improved threaded fasteners which include integral locking means to substantially prevent the unintended disengagement of the fasteners once they have been threadedly engaged yet can optionally be formed so as to be easy to assemble and disassemble, if desired, preferably without requiring specialized tools or additional locking parts separate from the fasteners.

SUMMARY OF THE INVENTION

This need is met by the locking fasteners of the present invention wherein ribs and/or locking fingers are formed concentrically around threaded portions of two members which make up each fastener, with the ribs and/or locking fingers interferingly interengaging one another as the two members are threadedly intermated to either removably or permanently lock the members together as desired for a given application. Preferably, the locking fasteners are formed of a polymeric resin and include concentric annular rings which are spaced from the threaded portions of the fastener members by interconnecting webs and define axially extending ribs. The ribs are rounded and preferably sinusoidal for removable yet locking fastener members and are serrated for permanently locking fastener members. One or both interconnecting webs can be radially expanded to define a support and gripping surface or surfaces between which an element, for example a heat shield for a fuel tank of a motor vehicle, can be engaged and supported.

In accordance with one aspect of the present invention, a locking fastener comprises a first member including a generally cylindrical stud defining a male thread therearound extending from a distal end of the stud toward a base end thereof, first locking means concentrically surrounding the base end of the stud and defining a first continuous series of locking fingers therearound and first web means for interconnecting the base end of the stud to the first locking means. A second member includes a housing having a generally cylindrical opening defining a female thread therein for receiving the male thread of the first member, second locking means concentrically surrounding the opening for defining a second continuous series of locking fingers and second web means interconnecting the housing and the second locking means. The first and second locking means are sized such that the first and second continuous series of locking fingers interferingly engage one another when the male thread is sufficiently intermated with the female thread. The first and second continuous series of locking fingers deflectingly pass over one another to permit the first and second members to be intermated yet sufficiently resist deflection such that the engagement of the first and second locking means secure the first and second members against rotation to lock the fastener.

In accordance with another aspect of the present invention, a locking fastener comprises a first member including a generally cylindrical stud defining a male thread therearound extending from a distal end of the stud toward a base end thereof, an annular ring concentrically surrounding the base end of the stud and defining a continuous series of circumferentially spaced axially extending ribs therearound and first web means for interconnecting the base end of the stud to the annular ring. A second member includes a housing having a generally cylindrical opening defining a female thread therein for receiving the male thread of the first member, locking means concentrically surrounding the opening for defining a continuous series of locking fingers and second web means interconnecting the housing and the locking means. The annular ring and the locking means are sized such that the ribs interferingly engage the locking fingers when the male thread is sufficiently intermated with the female thread. The ribs and the locking fingers deflectingly passing over one another to permit the first and second members to be intermated yet sufficiently resist deflection such that the engagement of the ribs and the locking fingers secure the first and second members against rotation to lock the fastener.

In accordance with yet another aspect of the present invention, a locking fastener comprises a first member including a generally cylindrical stud defining a male thread therearound extending from a distal end of the stud toward a base end thereof, locking means concentrically surrounding the base end of the stud and defining a continuous series of locking fingers therearound and first web means for interconnecting the base end of the stud to the locking means. A second member includes a housing having a generally cylindrical opening defining a female thread therein for receiving the male thread of the first member, an annular ring concentrically surrounding the opening and defining a continuous series of circumferentially spaced axially extending ribs therearound and second web means for interconnecting the housing and the annular ring. The locking means and the annular ring are sized and positioned such that the ribs interferingly engage the locking fingers when the first and second members are intermated by engaging the male thread with the female thread. The ribs and the locking fingers deflectingly pass over one another to permit the first and second members to be intermated yet sufficiently resist deflection such that the engagement of the ribs and the locking fingers lock the first and second members in a desired intermated position.

In accordance with still another aspect of the invention, a locking fastener comprises a first member including a generally cylindrical stud defining a male thread therearound extending from a distal end of the stud toward a base end thereof, a first annular ring concentrically surrounding the base end of the stud and defining a first continuous series of circumferentially spaced axially extending ribs therearound and a first web interconnecting the base end of the stud to the first annular ring. A second member includes a housing having a generally cylindrical opening defining a female thread therein for receiving the male thread of the first member, a second annular ring concentrically surrounding the opening and defining a second continuous series of circumferentially spaced axially extending ribs therearound and a second web interconnecting the housing and the second annular ring. The first and second annular rings are sized relative to one another to permit one annular ring to fit within the other with the first and second series of ribs being positioned on the first and second annular rings such that the first series of ribs interferingly engages the second series of ribs when the first and second members are intermated by engaging the male thread with the female thread. The annular rings and the ribs are sufficiently resilient to permit the first and second members to be intermated yet sufficiently rigid that engagement of the first and second series of ribs locks the fastener.

For removable fasteners of the present invention, the ribs and/or the locking fingers are rounded such that the first and second members are securely locked together once sufficiently intermated but can be separated without destruction of the first and second members. Preferably, the ribs and/or the locking fingers are substantially sinusoidal and intermeshing for the removable fasteners. For Permanent locking fasteners of the present invention, the ribs and/or the locking fingers are formed as ratcheting serrations to permanently lock the first and second members together once sufficiently engaged to one another. "Permanent lock" or "permanent locking" will be used herein to refer to fasteners which, once intermated, cannot be separated from one another without destruction of one or both of the fastener members. The first and/or second member may comprise drive means for receiving a tool for intermating the first and second members. Preferably the first and second members are formed of a polymeric resin material and the first and second web means are continuous webs of such material.

In accordance with another aspect of the present invention for one particular application, a locking fastener for supporting a heat shield a spaced distance from a fuel tank for a motor vehicle comprises a first member including a generally cylindrical stud defining a male thread therearound extending from a distal end of the stud toward a base end thereof, a first annular ring concentrically surrounding the base end of the stud and defining a first continuous series of circumferentially spaced axially extending ribs therearound and a first web interconnecting the base end of the stud to the first annular ring. A second member includes a housing having first and second ends, a generally cylindrical opening in the first end defining a female thread therein for receiving the male thread of the first member, a second annular ring concentrically surrounding the opening and defining a second continuous series of circumferentially spaced axially extending ribs therearound and a second web interconnecting the housing and the second annular ring. The first and second annular rings are sized relative to one another so that the second annular ring fits within the first annular ring with the first and second series of ribs being positioned on the first and second annular rings such that the first and second series of ribs interferingly engage one another when the first and second members are intermated by engaging the male thread with the female thread. The annular rings and the ribs are sufficiently resilient to permit the first and second members to be intermated yet sufficiently rigid that engagement of the first and second series of ribs locks the fastener. The second end of the second member is secured to the tank and the second web extends radially beyond the second annular ring to form a heat shield support. The heat shield is secured to and spaced from the tank by being engaged between the heat shield support and the first annular ring.

Preferably, the first and second members are formed of a polymeric resin material and the second end of the second member is appropriately welded to the tank. The first web may be extended radially beyond the first annular ring to define drive means for receiving a tool for intermating the first and second members and the drive means may further provide for engaging the heat shield to secure the heat shield to the heat shield support.

According to preferred embodiments, it is an object of the present invention to provide an improved threaded locking fastener which includes integral locking means; to provide an improved threaded locking fastener wherein ribs and/or locking fingers are formed concentrically around threaded portions of two members which make up the fastener, with the ribs and/or locking fingers interferingly interengaging one another as the two members are threadedly intermated to lock the members together; and, to provide an improved threaded fastener wherein interfitting annular rings are formed on two members making up the fastener with intermeshing ribs formed on the rings, the ribs on the rings interferingly engaging but being deflected to pass over one another as the two members of the fastener are threaded together.

Other objects and advantages of the invention will be apparent from the following description, the accompanying drawings and the appended claims.

BRIEF DESCRIPTION OF THE DRAWINGS

FIG. 6 is a plan view of a second member of a two member locking fastener in accordance with the present invention;

FIG. 7 is a front view of the second member of FIG. 6;

FIGS. 8 and 9 are sectional views of the second member of FIG. 6 taken along section lines 8—8 and 9—9, respectively;

FIG. 10 is a perspective view of an outwardly extending locking finger which can be used in an alternate embodiment of the locking fastener second member of FIGS. 6-9 shown on an enlarged scale; and FIG. 11 is a fragmented segment of locking ribs/fingers which are formed as ratcheting serrations to permanently lock the first and second members.

DETAILED DESCRIPTION OF THE INVENTION

Figure 1:
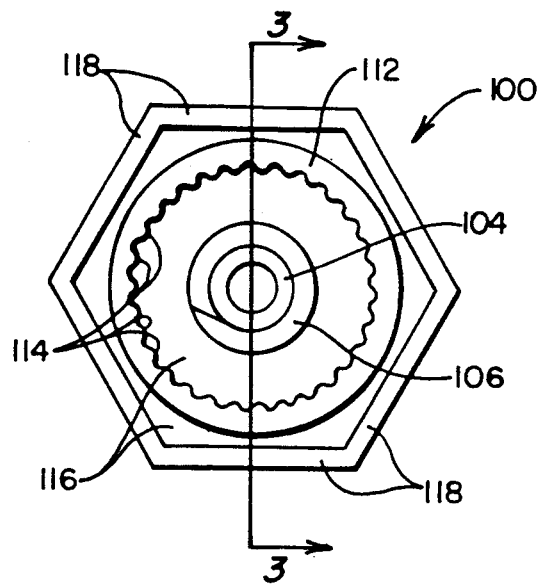
FIG. 1 is a plan view of a first member of a two member locking fastener in accordance with the present invention.
Figure 3:
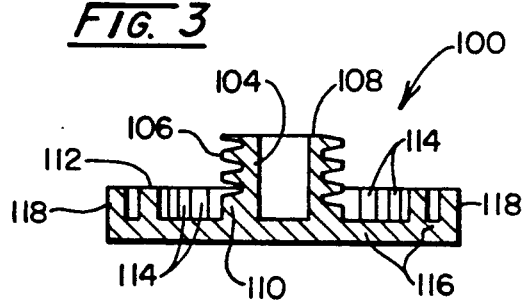
FIG. 3 is a sectional view of the first member of FIG. 1 taken along section line 3—3.
Figure 2:
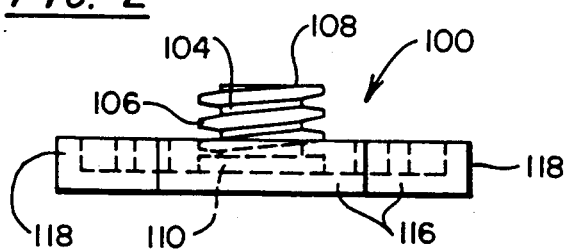
FIG. 2 is a front view of the first member of FIG. 1.

Reference is now made to the drawing figures wherein FIGS. 1-3 show a preferred embodiment of a first member 100 and FIGS. 5-9 show a preferred embodiment of a second member 102 of a two member locking fastener in accordance with the present invention. The first member 100 includes a generally cylindrical stud 104 defining a male thread 106 therearound extending from a distal end 108 of the stud 104 toward a base end 110 thereof. A first annular ring 112 concentrically the base end 110 of the stud 104 and defines a continuous series of circumferentially spaced axially extending ribs 114 therearound. Continuous as used herein with reference to the ribs 114, fingers or the like means that the ribs or fingers extend entirely around the fastener members without any gaps or spacing therebetween. First web means comprising the continuous web 116 provides for interconnecting the base end 110 of the stud 104 to the annular ring 112. The web 116 extends beyond the annular ring 112 and terminates in upwardly extending flanges 118 which define drive means for receiving a tool for rotating or driving the first member 100 to intermate the first member 100 and the second member 102. Preferably, the drive means or flanges 118 take the form of an enlarged hexagonal fastener head as shown although other drive head forms will be apparent to those skilled in the art.

The second member 102 includes a housing 130 having a generally cylindrical opening 132 defining a female thread 134 therein for receiving the male thread 106 of the first member 100. Locking means concentrically surround the opening 132 for engaging the ribs 114 of the annular ring 112 to prevent disengagement of the first and second members 100, 102 once the male thread 106 is sufficiently intermated with the female thread 134. In the preferred embodiment of FIGS. 6-9, the locking means comprises a second annular ring 136 concentrically surrounding the opening 132 and defining a second series of circumferentially spaced axially extending ribs 138 therearound and second web means comprising a web 140 for interconnecting the housing 130 and the second annular ring 136.

The first and second annular rings 112, 136 are sized relative to one another to permit one annular ring to fit within the other, as shown, the second annular ring 136 fits within the first annular ring 112. The first and second continuous series of ribs 114, 138 are positioned on the first and second annular rings 112, 136 such that the first series of ribs 114 interferingly engages the second series of ribs 138 when the first and second members 100, 102 are intermated by engaging the male thread 106 with the female thread 134. The annular rings 112, 136 and the ribs 114, 138 are sufficiently resilient to permit the first and second members 100, 102 to be intermated yet sufficiently rigid that engagement of the first and second series of ribs 114, 136 locks the fastener.

Figure 4:
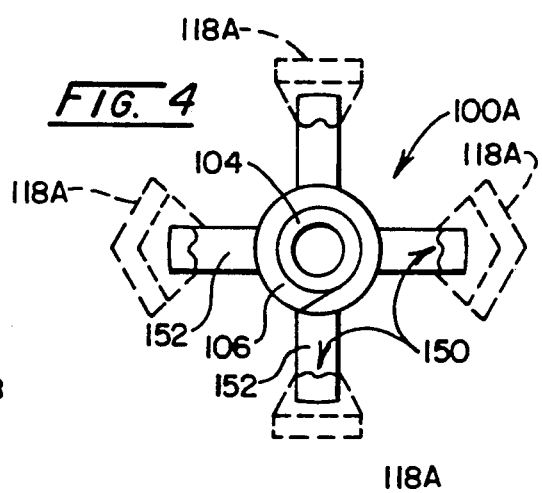
FIG. 4 is a plan view of an alternate embodiment of the locking fastener first member of FIG. 1 including a series of inwardly extending locking fingers.
Figure 5:
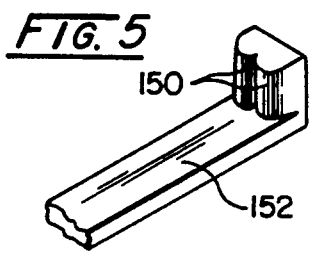
FIG. 5 is a perspective view of one of the inwardly extending locking fingers of FIG. 4 and a broken-away web portion shown on an enlarged scale.

In accordance with alternate embodiments of the present invention, either the first annular ring 112 or the second annular ring 136 can be replaced by locking means which define a series of locking fingers. The remaining annular ring and the locking means are sized such that the ribs 114 or 136 interferingly engage the locking fingers when the male thread 106 is sufficiently intermated with the female thread 134. For these alternate embodiments of the present invention, the ribs and the locking fingers deflectingly passing over one another to permit the first and second members 100, 102 to be intermated yet sufficiently resist deflection such that the engagement of the ribs and the locking fingers secure the first and second members 100, 102 against rotation to lock the fastener. FIGS. 4, 5 and 10 illustrate these alternate embodiments.

FIG. 4 is an alternate embodiment of a first member 100A wherein the first annular ring 112 has been replaced by locking means comprising locking fingers 150 and first web means comprising webs 152 which interconnect the locking fingers to the base 110 of the stud 104. The locking fingers 150 are each shown as including two of the ribs 114 as shown in FIGS. 1-3; however, it should be apparent that the locking fingers 150 can define one, two, three or more of the ribs 114 as required for a particular application or can take a completely different form, see for example FIG. 11. The web 152 can also be extended beyond the locking fingers 150 as suggested by the dashed line portions of FIG. 4 to define driving structure 118A or other structure. It should also be apparent that the second annular ring 136 can also be replaced by locking means. Such an alternate embodiment would appear substantially the same as the first member 100A of FIG. 4, but the locking fingers 150A would extend outwardly as shown in FIG. 10.

For removable fasteners in accordance with the present invention, the ribs 114, 138 and/or the locking fingers 150, 150A are rounded such that the first and second members 100, 102 are securely locked together once sufficiently intermated but can be separated without destruction of the first and second members. Preferably, the ribs 114, 138 and/or the locking fingers 150, 150A are substantially sinusoidal as shown and intermesh for removable fasteners. For locking fasteners of the present invention, the ribs and/or the locking fingers are formed as ratcheting serrations 114A, 138A as shown in FIG. 11 to permanently lock the first and second members 100, 102 together once sufficiently engaged to one another. While equal numbers of serrations can be formed for the permanent locking fasteners, a lesser number of serrations can be formed on either one of the members 100 or 102 to ease interconnection of the members, see 112A in FIG. 11. "Permanent locking" will be used herein to refer to fastener members which, once intermated, cannot be separated from one another without destruction of one of the fastener members.

The second member 102 may also comprise drive means for receiving a tool for intermating the first and second members 100, 102 as shown by the dotted hexagonal head 118B in FIG. 6. Preferably the first and second members 100, 102 are formed of a polymeric resin material and the first and second web 116, 140 are continuous webs of such material.

One application of the present invention will now be described with reference to FIG. 7. In this application, a heat shield 160 is supported by the members 100, 102 and spaced from a fuel tank 162 of a motor vehicle. A plurality of the second members 102 are secured to the tank 162 by an appropriate plastic welding operation. For this application the second members 102 of the fasteners do not require driving means 118B; however, the web 140 is expanded radially to form a heat shield support 140A. The heat shield is shaped to substantially conform to the portion of the tank 162 to be protected and circular openings 164 are formed in the shield to comfortably receive the second annular rings 136 of the second members 102 secured to the tank 162. A corresponding plurality of first members 100 are then intermated with the second members 102 such that the shield 160 is retained between the support 140A and the first annular rings 112. Due to the interaction of the ribs 114, 138 as previously described, the first and second members 100, 102 are securely locked together to resist separation due to vibration as the vehicle is operated yet can be removed if necessary for repair of the vehicle.

Having thus described the two member locking fastener of the present invention in detail and by reference to preferred embodiments thereof, it will be apparent that modifications and variations are possible without departing from the scope of the invention defined in the appended claims.

What is claimed is:

1. A locking fastener for supporting a heat shield a spaced distance from a fuel tank for a motor vehicle comprising:

a first member including a generally cylindrical stud defining a male thread therearound extending from a distal end of said stud toward a base end thereof, a first annular ring concentrically surrounding the base end of said stud and defining a first continuous series of circumferentially spaced axially extending ribs therearound and a first web interconnecting the base end of said stud to said first annular ring, a second member including a housing having first and second ends, a generally cylindrical opening in said first end defining a female thread therein for receiving the male thread of said first member, a second annular ring concentrically surrounding said opening and defining a second continuous series of circumferentially spaced axially extending ribs therearound and a second web interconnecting said housing and said second annular ring, said first and second annular rings being sized relative to one another so that said second annular ring fits within said first annular ring with said first and second series of ribs being positioned on said first and second annular rings such that said first and second series of ribs interferingly engage one another when said first and second members are intermated by engaging said male thread with said female thread, said annular rings and said ribs being sufficiently resilient to permit said first and second members to be intermated yet sufficiently rigid that engagement of said first and second series of ribs locks said fastener, said second end of said second member being secured to the tank and said second web extending radially beyond said second annular ring to form a heat shield support, the heat shield being secured to and spaced from the tank by being engaged between the heat shield support and said first annular ring, and said first web extending radially beyond said first annular ring to define drive means for receiving a tool for intermating said first and second members.

2. A locking fastener as claimed in claim 1 wherein said drive means further provides for engaging the heat shield to said heat shield support.

* * * * *